United States Patent [19]

Kenny

[11] Patent Number: 4,554,998
[45] Date of Patent: Nov. 26, 1985

[54] SPEEDOMETER CABLE LUBRICATING DEVICE

[76] Inventor: John Kenny, 524 Horseshoe Dr., Media, Pa. 19063

[21] Appl. No.: 652,368

[22] Filed: Sep. 19, 1984

[51] Int. Cl.$^4$ .............................................. F16N 7/00
[52] U.S. Cl. .................. 184/15.1; 184/105.1
[58] Field of Search ................ 184/15.1, 15.3, 105 R, 184/105 B, 105 C

[56] References Cited

U.S. PATENT DOCUMENTS 3,828,890  8/1974  Schott ............................ 184/105 R
3,884,329  5/1975  Steffen ............................. 184/15.1

OTHER PUBLICATIONS

Brochure of Dorman Products, Inc., Cincinnati, Ohio 45242 entitled "Stop Speedometer Cable Chatter in 20 Minutes or Less" ©1984.

*Primary Examiner*—Leonard E. Smith
*Attorney, Agent, or Firm*—Caesar, Rivise, Bernstein & Cohen, Ltd.

[57] ABSTRACT

Apparatus and method for lubricating cables, such as speedometer cables, disposed within a tubular sheath. The apparatus comprises a coupling adapted for releasable securement to one end of the cable and includes a passageway having an outlet in communication with the interior of the cable sheath when the fitting is secured to the coupling. A pressurized container of a low viscosity lubricant is included in the device as is an on-off valve. The valve is arranged to allow an aerosol of the lubricant to be carried from the container into the coupling and from there along the entire length of the annular space between the cable and its sheath under the pressure applied by the gas to effect the lubrication of the cable.

6 Claims, 5 Drawing Figures

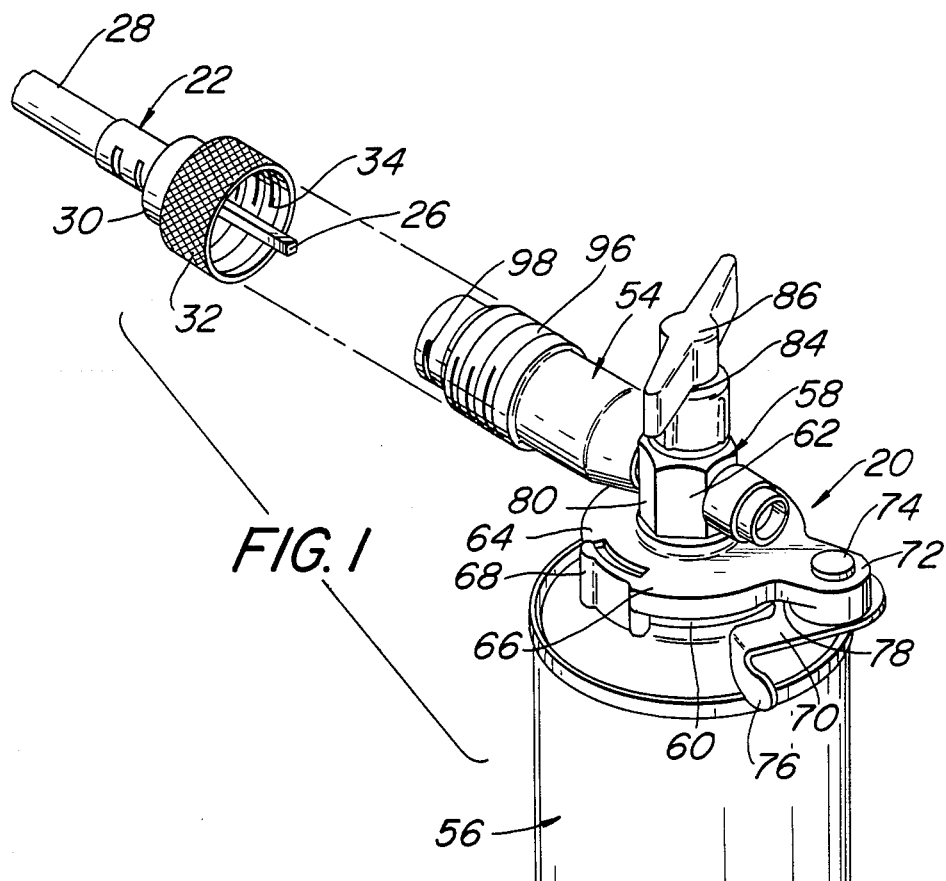
FIG. 1
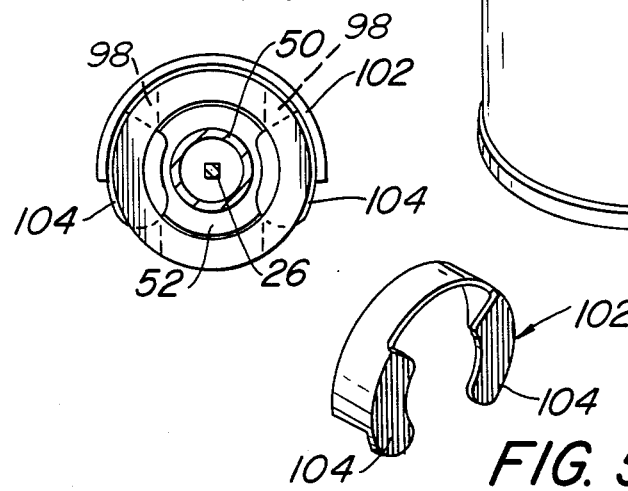
FIG. 4
FIG. 5

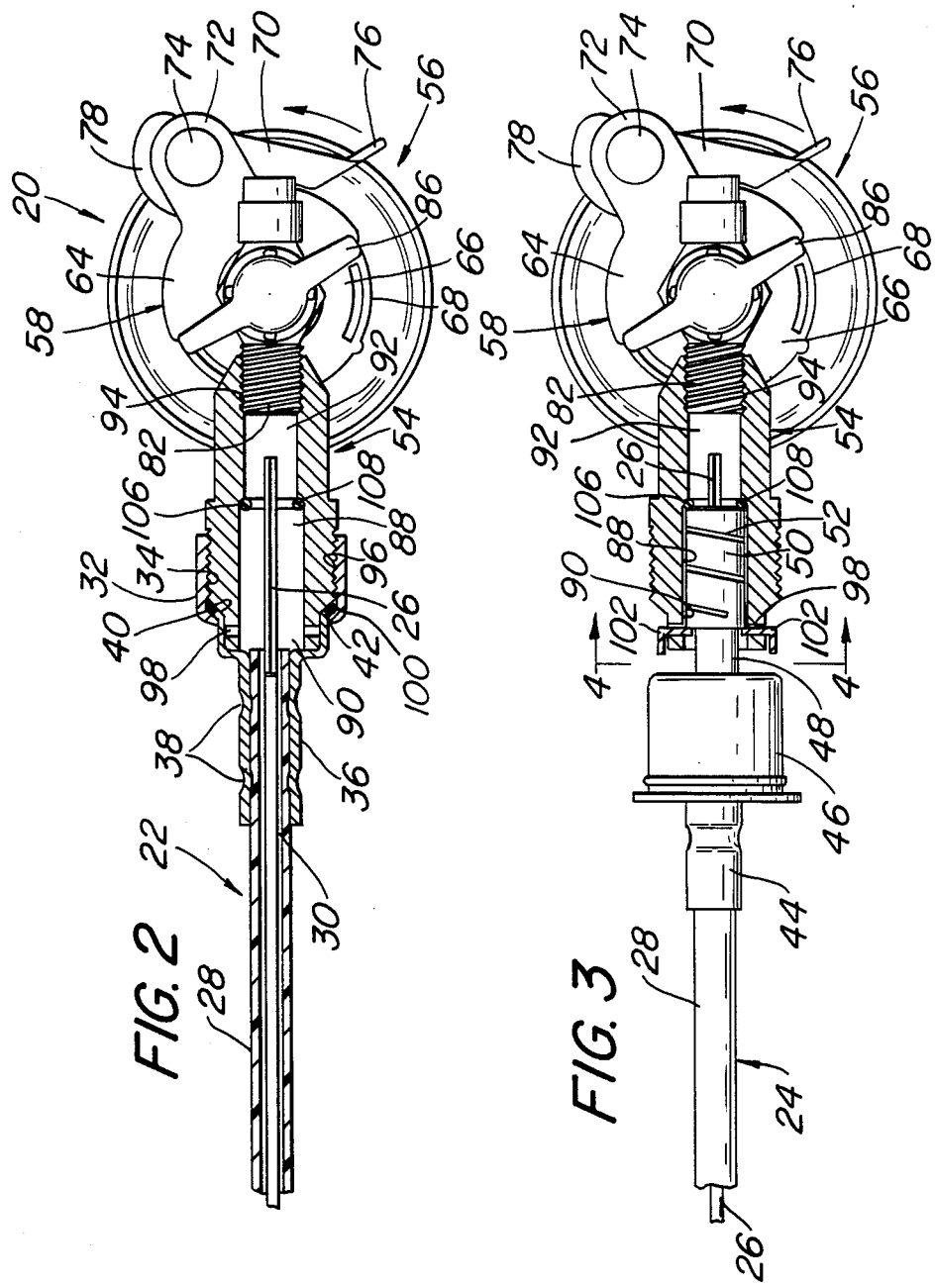

SPEEDOMETER CABLE LUBRICATING DEVICE

BACKGROUND OF THE INVENTION

This invention relates generally to lubrication devices and apparatus and more particularly to devices and apparatus for lubricating sheathed cables.

Sheathed cables for the transmission of rotary motion are commonly utilized in numerous apparatus and machines. For example sheathed rotary cables are used in automobiles to connect the transmission of the automobile to the speedometer which is mounted in the dashboard. Such cables are referred to as speedometer cables and consist of an elongated flexible cable element or wire disposed within the flexible sheath. The cable element is arranged to rotate within the sheath under the rotary force provided by the transmission when the automobile is in motion. Because of the length of of the speedometer cable, e.g., several feet, and the fact that the cable with its sheath normally follows a circuitous path from the transmission on the underside of the automobile frame to the interior of the dashboard, there is a great deal of frictional contact between the cable and the inside surface of the sheath as the cable rotates. This frictional contact requires the maintenance of a good lubrication between the sheath and cable to prevent any friction-induced noise or cable damage. Thus, it is highly desirable to lubricate the cable-sheath interface of the speedometer cable among routine maintenance operations performed on the automobile. Despite the desirability of such action, it has heretofore been neglected due to the difficulty and inconvenience of accomplishing it.

In this regard one prior art technique for effecting lubrication of a cable involves disconnecting the cable and sheath from the automobile speedometer and transmission so that the cable can be completely withdrawn from the sheath. After withdrawal of the cable it is lubricated by applying grease to its surface along its entire length and thereafter reinserting it into the sheath. The sheath with the cable is then repositioned in the automobile and reconnected. Obviously such a procedure is quite time consuming and therefore expensive. Moreover, the speedometer end of the speedometer cable is frequently located under the dashboard of the automobile in a relatively inaccessible position. Thus, the disconnection of the sheath and cable from the speedometer unit is also a time consuming operation. In fact in many cases such an operation necessitates the disassembly of various portions of the dashboard which may block access to the cable.

Further still, the withdrawal of the cable often requires that its sheath, with the cable still in it, be withdrawn from its normal position between the transmission and the speedometer because a bend or curved portion of the cable sheath resists the withdrawal action. Therefore, the sheath and the cable frequently have to be snaked out of their normal positions within the maze of other cabling and wiring under the dashboard and more less straightened before the cable can be withdrawn from the sheath. The reinsertion process of the cable into the sheath is at least as difficult inasmuch as the curved sheath resists cable insertion. This latter factor is another reason why it is often necessary to snake the sheath out from its normal position within the automobile for lubricating purposes.

The above described lubricating difficulties are so severe that as a result thereof speedometer cable lubrication is one of the most frequently neglected aspects of automotive service.

Heretofore I have found that one technique for obviating the above described problems in lubricating speedometer cables has been to disconnect the transmission end of the speedometer cable and to utilize a grease or oil injection tool or coupling which is configured to be connected to all types of fittings on the transmission end of the cable sheath and which is arranged to be mounted on a conventional grease gun or oil can. The grease or oil can then be manually pumped into the space between the cable and the sheath without requiring the complete removal of the cable from the sheath or the removal of the sheath from the automobile. This "in-position" lubrication technique offered substantial time and labor saving advantages over techniques requiring disassembly and removal of the cable/sheath.

Dorman Products, Inc. of Cincinnati, Ohio sells lubrication tools or adapters under the model designations 486-950, 486-951 and 486-952 which are arranged to be mounted on a conventional hand held grease gun. The tool is then connected to the fitting on the transmission end of the speedometer cable to lubricate the cable using the above described in-position technique.

In U.S. Pat. No. 3,884,329 (Steffen) there is shown a speedometer lubricating device which comprises a pressure oil can having a housing to receive lubricating oil and a push button actuator which upon reciprocation by a pumping action causes the oil to be delivered under pressure to a discharge fitting and from there into the transmission end of the speedometer cable.

While the use of prior art techniques, adapters and tools, such as that described above utilizing pressurized oil cans or grease guns, for in-position speedometer cable lubrication offer advantages over lubrication techniques involving cable and/or sheath removal, such in-position lubrication techniques still leave much to be desired from the standpoint of effectiveness and efficiency of lubrication. In this connection the grease or oil which is manually injected by the grease gun or oil can into the space between the cable and the sheath tends to remain toward the transmission end of the cable instead of extending and flowing throughout the whole length of the cable.

OBJECTS OF THE INVENTION

Accordingly, it is a general object of the instant invention to overcome the disadvantages of the prior art.

It is a further object of the instant invention to provide apparatus for quickly and effectively lubricating a conventional, elongated sheathed cables.

It is still a further object of the instant invention to provide a method for quickly and efficiently lubricating a conventional cable disposed within a tubular sheath and without requiring the removal of the cable from its normal position within the sheath.

These and other objects of the instant invention are achieved by providing apparatus for lubricating a conventional elongated cable disposed within a tubular sheath. The sheath includes a fitting at one end thereof. The apparatus comprises coupling means adapted for releasable securement to the fitting and includes a cavity having an outlet in communication with the interior of the sheath when the fitting is secured to the coupling. A container is provided having a relatively thin lubricating liquid disposed therein under a gas pressure. Valve means are provided having an outlet connected to the cavity and an inlet connected to the container. The valve means is arranged to selectively connect its inlet and outlet, whereupon the lubricating liquid is carried as an aerosol from the container into the cavity and from there through the length of the cable sheath under the pressure applied by the gas.

DESCRIPTION OF THE DRAWING

FIG. 1 is a perspective view of a speedometer cable lubricating device constructed in accordance with the instant invention and arranged to lubricate one common type of speedometer cable;

FIG. 2 is an top plan view, partially in section showing the device of this invention connected to the type of speedometer cable shown in FIG. 1;

FIG. 3 is an top plan view similar to FIG. 2 but showing the device of this invention connected to another common type of speedometer cable.

FIG. 4 is an enlarged sectional view taken along line 4—4 of FIG. 3; and

FIG. 5 is a perspective view of a portion of the device shown in FIG. 4.

DESCRIPTION OF THE PREFERRED EMBODIMENT

Referring now in greater detail to the various figures of the drawing wherein like reference characters refer to like parts, there is shown at 20 a device for lubricating conventional speedometer cables and which device constructed in accordance with the teachings of the present invention.

Before describing the details of device 20, it must be pointed out that the device 20 while described herein for effecting the lubrication of speedometer cables, can be utilized to lubricate any type of sheathed rotary cable, e.g., a tachometer cable, etc.

Two conventional types of speedometer cables are shown in the drawing herein. To that end there is shown in FIGS. 1 and 2 the transmission end of one type of conventional cable 22. In particular the cable 22 is of the type commonly utilized in automobiles manufactured by General Motors and Chrysler Corporation. In FIG. 3 there is shown the transmission end of a second conventional cable type 24, i.e., the type manufactured by Ford Motor Company and American Motors Corporation.

The speedometer cable 22 basically comprises an elongated flexible cable element or wire 26 disposed centrally within an elongated, flexible cylindrical sheath 28. The end of the cable wire 26 (FIG. 2) at the transmission end thereof is of square cross section, while the remainder of the wire is of circular cross section. An annular space 30 exists between the interior surface of the sheath 28 and the exterior surface of the cable wire 26. The assembled cable and sheath is quite flexible to enable it to be bent to conform to any path between the transmission of the automobile and the speedometer mounted in the dashboard of the automobile.

Inasmuch as the subject invention is utilized to lubricate the cable via its lower or transmission end, only that end of each cable type is shown herein. To that end the transmission end of cable 22 is in the form of either a nut-like fitting (not shown) or a knurled fitting 32 having internal threads 34 therein. The fitting 32 is mounted on a sleeve 36 which is crimped in place on the cable sheath 28 at 38. The sleeve 36 includes a flanged end portion 40 extending through a central opening 42 in the fitting 32. The fitting 32 is arranged to be threadly engaged on a mating portion of the transmission of the General Motors or Chrysler automobile.

As can be seen in FIG. 3 the speedometer cable 24 also includes an elongated, flexible cable element or wire 26 whose transmission end is of square cross section. The wire 26 of cable 24 is disposed within a flexible tubular sheath 28. The transmission end of the cable 24 is in the form of a fitting comprising a sleeve 44 crimped onto the cable sheath and terminating in a first cylindrical metal body 46 which narrows into a narrow diameter neck portion 48 and terminates into an intermediate diameter cylindrical portion 50. The portion 50 includes spiral grooves 52 in its peripheral surface.

As stated earlier the device 20 of the subject invention can be utilized to effect the lubrication of either of the cables 22 and 24 (as well as other types too). That action is accomplished by the connection of the fitting of each cable to a coupling 54, to be described in detail hereinafter, which forms a portion of the device 20.

Referring now to FIG. 1, it can be seen that device 20 basically comprises the heretofore identified coupling 54, a pressurized container 56, and a valve assembly 56. The container 52, as shown herein basically comprises a conventional gas-pressurized can having a relatively thin lubricating liquid disposed therein. One particularly effective canned lubricant is sold by Environmental Materials Corporation under the Trademark AR-TIC-AIR oil charge and comprises a high grade 525 viscosity oil. The oil is held under pressure within the can by a conventional gas propellant located therein. The container 56 also includes an outlet (not shown) located at the chime 60 thereof.

The valve assembly 58 is of conventional construction, and in accordance with the preferred embodiment of the invention is sold by K & D Manufacturing Company of Lancaster, Pennsylvania, under the Model designation KD2225. Basically the valve assembly 58 comprises a manually operable on/off valve 62 and a releasable clamp mechanism 64. The clamp mechanism is arranged to mount and secure the valve onto the chime 60 of the container 56. To that end the clamp mechanism 64 comprises a generally circular, planar cap 66 having a sidewall 68 extending about one half of the periphery thereof. The cap is arranged for disposition over the container's chime 60, with the cap's sidewall 68 extending along the chime, and with a flanged free edge portion (not shown) of the sidewall lying under the chime. A locking lever 70 is mounted on an ear 72 projecting outward from the cap 66 opposite the sidewall 68. The lever is pivotably mounted on the ear via a pivot pin 74. The lever 70 is a generally planar member having a flanged tab 76 and a chime engaging portion 78. The tab 76 is arranged to be engaged by the users finger to pivot the lever about pin 74 in the clockwise direction as shown by the curved arrows in FIGS. 2 and 3 to cause the engaging portion 78 of the lever to be moved under the chime, thereby locking the valve assembly in place.

The valve 62 itself includes a body 80 having an inlet port (not shown) in communication with an opening (not shown) in the clamp mechanism cap 66. That later opening is disposed over the outlet of the container to enable lubricating fluid to be carried from the container 56 into the valve 58 under the pressure of the gas propellant in the container. The valve body 80 also includes an outlet port in the form of a hollow threaded nipple 82 (FIGS. 2 and 3). A valve stem 84 extends into the valve's body 80 and terminates at its free end in a winged handle 86. The valve stem is arranged to occlude (block) a passageway (not shown) in the body 80 between the valve's inlet and outlet when the handle 84 is rotated to an "off" position and to open that passageway when the handle is rotated in the opposite direction to an "open" position.

The device's coupling 54 is best seen in FIGS. 2 and 3 and is in the form of a generally hollow tubular member of sidewall having an enlarged longitudinally extending passageway or cavity 88 extending therethrough. The passageway 88 terminates at one end 90 in an enlarged diameter bore and at the opposite end in a reduced diameter bore 92. The free end of bore 92 is internally threaded at 94. The nipple 82 of the valve is arranged to be threadedly engaged in the bore 94 to mount the coupling on the valve assembly. When so mounted the passageway 88 in the coupling is in fluid communication with the outlet of the valve.

As can be seen in FIGS. 1-3, the end of the free end of the coupling 54 includes an external helically threaded portion 96. Those threads serve as the means to enable the coupling to be releasably secured to a threaded fitting on a speedometer cable, e.g., the transmission end of the cable type 22.

As can be seen the free end of the coupling also includes a slot 98 extending through diametrically opposed portions the side wall of the coupling 50. The slot 98 serves as means for receiving a clip, to be described later, to effect the releasable securement of the coupling 54 to the fitting on the transmission end of the speedometer cable type 24.

In order to effect a good seal between the coupling and the fitting on the type 22 cable the free end of the coupling includes a chamfered surface on which is located a sealing "O" ring 100. Accordingly when the threaded end 96 of the coupling is screwed into the fitting 32 the "O" ring 100 is tightly interposed between the fitting and the coupling to prevent the egress of any of the lubrication from the coupling-fitting interface.

Operation of the device 20 for lubricating a cable of the type 22 is as follows: The fitting 32 is disconnected from the transmission of the automobile and the device 20 brought to the position of the fitting. The fitting 32 is then thready engaged on the threaded end 96 of the device's coupling 54 so that the passageway 88 of the coupling is in fluid communication with the annular space 30 between the cable wire and its sheath. The valve handle 86 is then rotated from the normally closed position to the open position, whereupon the liquid lubricant exiting the container 56 is atomized into an aerosol by the gas propellant. The aerosol is carried by the gas propellant through the valve from its inlet to its outlet, through passageway 88 and into the cable. From there the aerosol lubricant is carried along the entire length of the annular space 30 of the cable, also under the force of the pressurized gas propellant. By virtue of the low viscosity of the lubricant, coupled with the fact that it is in the form of an aerosol which carried by the pressurized gas the lubricant is quickly and efficiently carried throughout the length of the cable, thereby effectively lubricating the cable.

In order to render the coupling 50 suitable for use with cables of the type shown in FIG. 3 and designated by the reference numeral 24, the bore portion 90 of the passageway 88 is of sufficient inside diameter to accomodate the tubular portion 50 of the fitting at the transmission and of the cable 24. In order to hold that fitting portion within the bore portion 90 a clip 102 is provided. As can be seen in FIGS. 4 and 5, the clip 102 is of the "horseshoe" type and is arranged to be releasably secured within the slot 98 in the coupling 54. Thus, when the fitting portion 50 is located within bore 90, the ledge formed at the interface of fitting's reduced neck 50 and end portion 52 is engaged by radially extending ear portions 104 of the horseshoe clip 102, thereby preventing the cable's fitting from being pulled out of the coupling.

In order to effect a fluid tight seal between the coupling 54 and the fitting of cable 24 the coupling 54 includes a shoulder portion 106 at the interface of the bores 90 and 92 of the passageway 88 and on which a resilient "O" ring seal 108 is located. Thus when portion 50 of the cable 24 is located within the bore 90 the "O" ring is tightly interposed between portion 50 and the shoulder 106 to prevent the egress of the aerosol lubricant from the coupling-fitting interface.

As should now be appreciated by those skilled in the art the device of my invention and its method of use enables the inexpensive lubrication of speedometer or other types of sheathed, rotary cables without requiring their removal or complete disconnection from the apparatus in which they are mounted. Moreover the use of the gas propelled aerosol lubricant ensures that the entire length of the cable is lubricated quickly and efficiently.

Without further elaboration, the foregoing will so fully illustrate my invention that others may, by applying current or future knowledge, readily adopt the same for use under various conditions of service.

I claim:

1. A device for lubricating a conventional elongated cable disposed within a tubular sheath, said sheath having a fitting at one end thereof, said apparatus comprising coupling means adapted for releasable securement to said fitting and including a cavity having an outlet in communication with the interior of said sheath when said fitting is secured to said coupling means, said fitting including an end portion adapted to be disposed within said cavity and wherein said coupling includes clip-connector means for releasably holding said end portion of said fitting within said cavity, container means having a relatively thin lubricating liquid disposed therein under gas pressure, and valve means having an outlet connected to said cavity and an inlet connected to said container, said valve means being arranged to selectively connect its inlet and outlet, whereupon said lubricating liquid is carried as an aerosol from said container into said cavity and from there through the length of said cable sheath under the pressure applied by said gas.

2. The apparatus of claim 1, wherein said clip connector means comprises a horseshoe type clip, and wherein said coupling means includes a slot for receipt of said clip therein.

3. The apparatus of claim 2 additionally comprising sealing means located in said passageway.

4. A device for lubricating a conventional elongated cable disposed within a tubular sheath, said sheath having a fitting at one end thereof, said apparatus comprising coupling means adapted for releasable securement to said fitting and including a cavity having an outlet in communication with the interior of said sheath when said fitting is secured to said coupling means, said fitting including an end portion adapted to be disposed within said cavity and wherein said coupling includes clip-connector means for releasably holding said end portion of said fitting within said cavity, container means having a relatively thin lubricating liquid disposed therein under gas pressure, and valve means having an outlet connected to said cavity and an inlet connected to said container, said valve means being arranged to selectively connect its inlet and outlet, whereupon said lubricating liquid is carried as an aerosol from said container into said cavity and from there through the length of said cable sheath under the pressure applied by said gas, said container comprising a portable, pressurized container.

5. The apparatus of claim 4, wherein said clip connector means comprises a horseshoe type clip, and wherein said coupling means includes a slot for receipt of said clip therein.

6. The apparatus of claim 5 additionally comprising sealing means located in said passageway.

* * * * *